United States Patent [19]

Yamakawa et al.

[11] Patent Number: 5,312,786
[45] Date of Patent: May 17, 1994

[54] ALUMINUM NITRIDE SINTERED BODY AND PROCESS FOR PRODUCING THE SAME

[75] Inventors: Akira Yamakawa; Douiti Sogabe; Kohei Shimoda, all of Hyogo, Japan

[73] Assignee: Sumitomo Electric Industries Ltd., Japan

[21] Appl. No.: 85,302

[22] Filed: Jun. 29, 1993

Related U.S. Application Data

[62] Division of Ser. No. 838,800, Mar. 16, 1992.

[30] Foreign Application Priority Data

Oct. 29, 1990 [JP] Japan ................... 2-288570
Sep. 27, 1991 [JP] Japan ................... 3-249734

[51] Int. Cl.$^5$ ............................................. C04B 35/58
[52] U.S. Cl. ........................................ 501/98; 501/96; 264/65; 264/63
[58] Field of Search ............... 501/96, 98, 153; 264/65.63

[56] References Cited

U.S. PATENT DOCUMENTS

| | | | |
|---|---|---|---|
| 4,877,760 | 10/1989 | Okuno et al. | 501/98 |
| 5,001,089 | 3/1991 | Kasori et al. | 501/96 |
| 5,147,832 | 9/1992 | Shimoda et al. | 501/96 |

FOREIGN PATENT DOCUMENTS

| | | | |
|---|---|---|---|
| 342595 | 11/1989 | European Pat. Off. | C04B 35/58 |
| 452871 | 10/1991 | European Pat. Off. | C04B 35/58 |
| 472776 | 3/1992 | European Pat. Off. | C04B 35/58 |
| 62-187172 | 8/1987 | Japan . | |
| 63-274668 | 11/1988 | Japan . | |
| 64-6141 | 2/1989 | Japan . | |
| 2-124772 | 5/1990 | Japan . | |

*Primary Examiner*—Mark L. Bell
*Assistant Examiner*—Deborah Jones
*Attorney, Agent, or Firm*—Jordan B. Bieman Bierman and Muserlian

[57] ABSTRACT

An aluminum nitride sintered body characterized by comprising aluminum nitride as the main component, containing a titanium compound, and having a black color, a transmittance of 10% or less with the light having a wavelength in the range of from 500 to 650 nm and a heat conductivity of 120 W/m·K or more. The sintered body is produced by adding 0.05 to 5% by weight, in terms of Ti, of a titanium compound and a sintering aid compound and, if necessary, a compound capable of forming carbon after being thermally decomposed to an aluminum nitride powder, molding the mixture, heating the molding in vacuo, air or a nitrogen gas, a hydrogen gas or an atmosphere comprising a mixture of these gases until the residual carbon content is reduced to 2.0% by weight or less, and sintering the heat-treated mixture in a nonoxidizing atmosphere containing nitrogen at 1600° C. or above. The titanium compound is $Ti_nO_{2n-1}$ or a solid solution comprising $Ti_nO_{2n-1}$ and nitrogen partly dissolved therein in the solid solution form wherein n is 1 or more, or a compound represented by the formula $TiN_xO_y$ wherein $0<x<1$ and y is $3/2(1-x)$.

There is provided an aluminum nitride sintered body wherein both the light shielding property and the heat conductivity are stabilized.

5 Claims, 2 Drawing Sheets

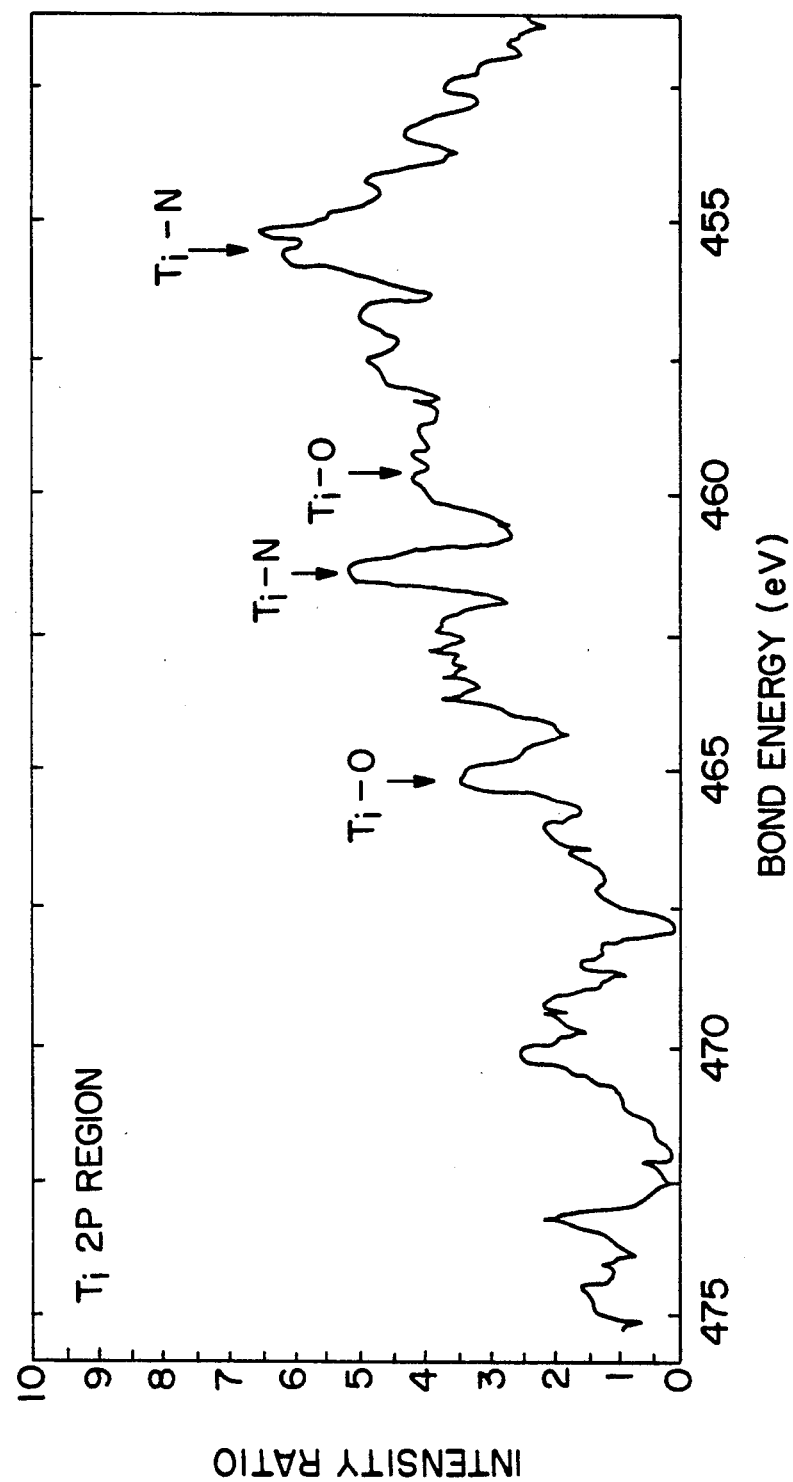

ALUMINUM NITRIDE SINTERED BODY AND PROCESS FOR PRODUCING THE SAME

This application is a division of application Ser. No. 07/838,800, filed Mar. 16, 1992.

DESCRIPTION

1. Technical Field

The present invention relates, to an aluminum nitride sintered body and a process for producing the same, in particular to an aluminum nitride sintered body which is black and has a high heat conductivity.

2. Background Art

In recent years, the technical advance of a large scale integrated circuit (LSI) device is significant and, in particular, an improvement in the integration density is remarkable. With an improvement in the integration density, the size of the IC chip has been increased and the density of the wiring per IC chip has been increased. This has led to a remarkable increase in the heat build up per IC chip. For this reason, great importance has come to be placed on the heat radiating property of a material constituting a package on which IC chips are mounted. An alumina sintered body has hitherto found extensive use as the material of an IC chip substrate. With the heat conductivity of the alumina sintered body, however, it is becoming difficult to ensure a heat radiating property sufficient to cope with an increase in the heat buildup of the IC chip. Studies have been made also on the use of a beryllium oxide sintered body having a high heat conductivity as an alternative to the alumina sintered body. The beryllium oxide is, however, difficult to handle due to the toxicity of the material per se and therefore can be used for a special application only.

On the other hand, an aluminum nitride sintered body has a heat conductivity (theoretical value: 320 W/m·K) comparable with that of the beryllium oxide sintered body, is nontoxic and has a high insulating property. Therefore, it has attracted special interest recently in the field of semiconductor industries and electronics including a high output laser, wherein the heat radiating property becomes an issue.

As described above, aluminum nitride is theoretically a material having a high heat conductivity and a high insulating property as a single crystal. Since, however, aluminum nitride is a material having a covalent bond character of 50%, the diffusion coefficient of the constituent elements is small. Further, the sinterability of the aluminum nitride powder is much lower than that of the aluminum oxide powder. Therefore, when a sintered body is produced from the aluminum nitride powder, the relative density (based on the theoretical density of aluminum nitride, that is, 3.26 g/cm$^3$) of the aluminum nitride sintered body produced by powder molding followed by sintering is as low as 70 to 80% although it depends upon the sintering conditions, and the sintered body has a large amount of pores.

On the other hand, the heat conduction of the aluminum nitride sintered body having an insulating property occurs through the movement of phonons as pseudo-particles. For this reason, defects such as pores or impurities in the crystal lattice cause scattering of phonons, which brings about a lowering in the heat conductivity of the aluminum nitride sintered body.

Under these circumstances, various proposals have been made for the purpose of producing an aluminum nitride sintered body having a high conductivity.

In order to produce an aluminum nitride sintered body having a high conductivity, however, it is necessary to use a starting material having a high purity and to prevent the contamination with impurities in the manufacturing process. The resultant aluminum nitride sintered body is limited to a white or thinly colored sintered body, which renders the sintered body unusable in applications where the transmission of light becomes a problem. For this reason, the development of a colored aluminum nitride sintered body has been desired in such applications.

The present inventors have already proposed a highly heat conductive aluminum nitride sintered body having a light shielding property in Japanese Patent Laid-Open No. 124772/1990.

In the conventional light shielding aluminum nitride sintered body, the light shielding property is obtained by distributing a transition metal compound in the sintered body and allowing the light to be absorbed or diffused in the compound. No properties of the aluminum nitride sintered body, such as heat conductivity, can be sufficiently obtained depending upon the type of the transition metal added. This appears to derive from the fact that the transition metal compound in the aluminum nitride sintered body is not sufficiently controlled.

Accordingly, an object of the present invention is to eliminate the above-described problem and, at the same time, to provide an aluminum nitride sintered body stabilized in the properties such as light shielding property and heat conductivity and a process for producing the same.

DISCLOSURE OF THE INVENTION

The present inventors have made detailed studies on an aluminum nitride sintered body and, as a result, have found that particularly the addition of a titanium compound as a means for stabilizing the heat conductivity and meeting the light shielding property requirement serves to stabilize both the light shielding property and the heat conductivity.

Accordingly, the present invention relates to an aluminum nitride sintered body characterized by comprising aluminum nitride as the main component, containing a titanium compound, and having a black color, a transmittance of 10% or less with the light having a wavelength in the range of from 500 to 650 nm and a heat conductivity of 120 W/m·K or more.

The titanium compound includes $Ti_nO_{2n-1}$ or a solid solution comprising $Ti_nO_{2n-1}$ and nitrogen partly dissolved therein in the solid solution form wherein n is 1 or more. The n value may vary widely. When n is 1, the titanium compound is TiO and, for example, when n is 10, it is $Ti_{10}O_{19}$. The object of the present invention can be attained so far as the titanium compound is none of TiN, $Ti_2O_3$ and $TiO_2$. It is conceivable that the $Ti_nO_{2n-1}$ may contain nitrogen in a solid solution form. However, it is difficult to determine the amount of such nitrogen by analysis.

The content of $Ti_nO_{2n-1}$ in aluminum nitride is 0.05 to 5.0% by weight, preferably 0.05 to 1 0% by weight, in terms of Ti. When the content is less than 0.05% by weight, the light shielding property is unsatisfactory. On the other hand, when it exceeds 5.0% by weight, the insulating property deteriorates.

Further, the titanium compound includes a compound represented by the formula $TiN_xO_y$ wherein $0<x<1$ and y is $3/2 \cdot (1-x)$. It is possible that the y value varies widely. When the x value is 0.95, the compound is $TiN_{0.95}O_{0.075}$. The X-ray diffractometry of $TiN_xO_y$ comprising TiN and oxygen dissolved therein in the form of a solid solution reveals that the titanium compound has a TiN crystalline structure. The amount of oxygen in the solid solution form is determined by estimating the bond energy of elementary titanium according to ESCA (X-ray photoelectron spectroscopy) to simultaneously determine two kinds of bonding states, that is, the energy of bonding between a titanium atom and an oxygen atom of 459 and 465 eV ($\pm 1$ eV) and the energy of bonding between a titanium atom and a nitrogen atom of 456 and 462 eV ($\pm 1$ eV).

The content of the Ti-N-O compound in the aluminum nitride powder or aluminum nitride sintered body is 0.05 to 5.0% by weight in terms of Ti. When the content is less than 0.05% by weight, the shielding property of the aluminum nitride sintered body is unsatisfactory, while when it exceeds 5.0% by weight, the insulating property of the aluminum nitride sintered body deteriorates.

According to a preferred embodiment of the aluminum nitride sintered body of the present invention, the sintered body has a linear transmittance of 5% or less with the light having a wavelength of 500 nm or a linear transmittance of 10% or less with the light having a wavelength of 6.0 μm and a heat conductivity of 120 W/m·K or more in terms of a sample thickness of 0.5 mm.

The present invention also provides a process for producing an aluminum nitride sintered body characterized by adding 0.05 to 5% by weight, in terms of Ti, of a titanium compound and a sintering aid to an aluminum nitride powder, molding the mixture, heating the molding in vacuo, air, a nitrogen gas, a hydrogen gas or an atmosphere comprising a mixture of these gases until the residual carbon content is reduced to 0.2% by weight or less, and sintering the heat-treated mixture in a nonoxidizing atmosphere containing nitrogen at 1600° C. or above.

Further, the present invention provides a process for producing an aluminum nitride sintered body characterized by adding 0.05 to 5% by weight, in terms of Ti element, of a titanium compound, a compound capable of forming carbon after being thermally decomposed and a sintering aid to an aluminum nitride powder, molding the mixture, heating the molding in vacuo, air, a nitrogen gas, a hydrogen gas or an atmosphere comprising a mixture of these gases until the residual carbon content is reduced to 0.2 to 2.0% by weight, and sintering the heat-treated mixture in a nonoxidizing atmosphere containing nitrogen at 1600° C. or above.

In the process according to the present invention, it is preferred to use an aluminum nitride powder having a high purity. For example, it is preferred that the absorption peak of aluminum nitride (wherein aluminum is coordinated with four nitrogen atoms) obtained by an infrared absorption method using KBr be observed at 750 cm$^{-1}$ or less. In particular, in the aluminum nitride powder, the amount of oxygen, carbon, etc., in the solid solution form in the aluminum nitride powder particle and the amount of metallic elements as impurities in the powder should be small.

The titanium compound to be added to the aluminum nitride powder should be convertible into metallic titanium, TiO or $TiO_2$ when heated. Preferred examples of such a compound include organometallic compounds, metal alkoxide compounds and stearates. The amount of addition of the titanium compound is still preferably in the range of from 0.05 to 5.0% by weight in terms of Ti for the reasons as described above. The titanium compound to be added may also be $TiO_2$ (having a rutile crystal structure) comprising ultrafine particles having a primary particle diameter of 500 nm or less.

At least one compound selected among those of rare earth elements and alkaline earth elements is used as the sintering aid. The amount of addition of the sintering aid is preferably in the range of from 0.01 to 10.0% by weight in terms of oxide. The addition of the sintering aid facilitates the production of an aluminum nitride sintered body having a high density, so that the object of the present invention can be attained.

The above-described starting materials are mixed together and molded, and the resultant molding is heated at 200° to 1000° C. in the air, vacuo, a nitrogen gas, a hydrogen gas or an atmosphere comprising a mixture of these gases. The content of the residual carbon is regulated by either adding a compound capable of forming carbon after being thermally decomposed or not. In this case, the reason why the heating atmosphere is limited as described above resides in that the aluminum nitride powder suffers no significant oxidation and the residual carbon content can be regulated thereby. The term "residual carbon" used herein is intended to mean liberated carbon. The residual carbon content is limited to 2.0% by weight or less because when the content exceeds 2.0% by weight, TiN and TiC are formed and besides the relative density of the aluminum nitride sintered body is reduced to 90% or less.

The molding thus treated is sintered at a temperature of 1600° C. or above in a nonoxidizing atmosphere containing nitrogen.

BRIEF DESCRIPTION OF DRAWINGS

FIG. 2 is a graph showing the results of the ESCA analysis of an aluminum nitride sintered body prepared in Example 3.

BEST MODE FOR CARRYING OUT THE INVENTION

Figure 1:
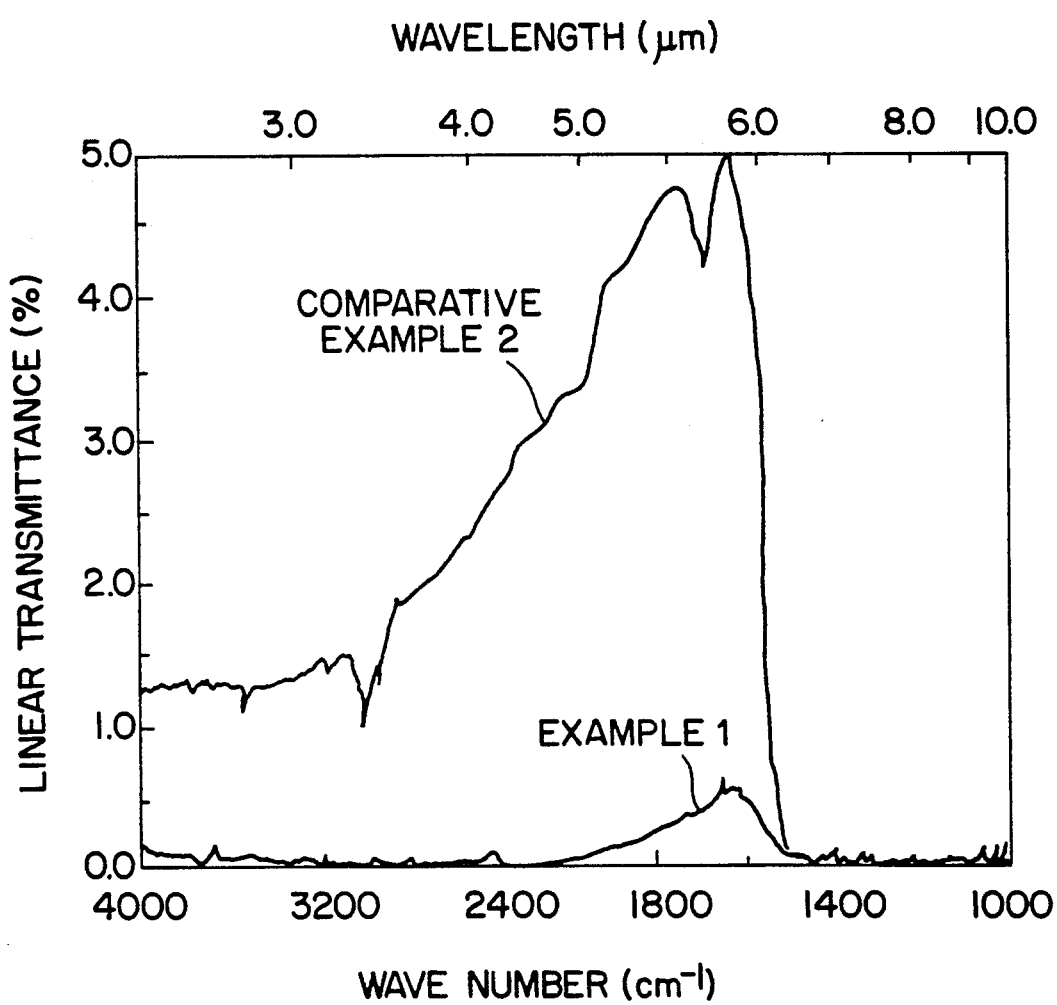
FIG. 1 is a graph showing the results of measurement of the linear transmittance of an aluminum nitride sintered body prepared in Example 3.

The present invention will now be described in more detail with reference to the following Examples.

EXAMPLE 1

An $Y_2O_3$ powder (particle diameter: 0.5 μm) and a titanium compound of the type and in an amount as specified in Table 1 were added to an AlN powder having an average particle diameter of 0.8 μm (oxygen: 1.5%, carbon: 0.03%, metal impurities: 0.1% or less in total). They were mixed with each other in alcohol, dried and molded on a dry press to prepare moldings each having a diameter of 15 mm and a thickness of 3 mm. The moldings were heated in the air at 400° C. for 30 min to remove the binder, and sintered in a nitrogen gas flow under sintering conditions specified in the Table 1. The properties of the resultant sintered bodies are also given therein. As is apparent from the table, according to the present invention, it is possible to produce an AlN sintered body having an excellent shielding property and a high heat conductivity.

TABLE 1

| No. | Y$_2$O$_3$ amt. of addition | Ti compd. | Amount of addition, weight % (in terms of Ti) | Sintering conditions (°C. × H) | Ti compd. (according to TEM) | heat conductivity (W/m · K) | transmittance (%) |
| --- | --- | --- | --- | --- | --- | --- | --- |
| *1 | 3.0% | Ti alkoxide | 0.01 | 1850° C. × 3H | TiO | 180 | 15 |
| 2 | " | " | 0.07 | " | TiO | 170 | 4 |
| 3 | " | " | 0.20 | " | TiO | 170 | 2 |
| 4 | " | " | 0.70 | " | TiO | 170 | 1 |
| 5 | " | " | 2.0 | " | TiO | 160 | 1 |
| 6 | " | Ti stearate | 0.5 | " | TiO | 170 | 1 |
| 7 | 1.0 | " | " | " | TiO | 170 | 1 |
| 8 | 0.5 | " | " | " | TiO | 170 | 1 |
| 9 | 7.0 | " | " | " | TiO | 180 | 1 |
| 10 | 1.0 | " | " | 1750° C. × 3H | TiO | 170 | 1 |

Note:
*Comparative Example

EXAMPLE 2

A titanium compound in an amount of 0.2% by weight in terms of Ti and a sintering aid listed in Table 2 were added to an AlN powder having an average particle diameter of 0.8 μm (oxygen: 1.5%, carbon: 0.03%, metal impurities: 0.1% or less in total). They were sufficiently mixed with each other in alcohol, dried and molded on a simple spindle press to prepare moldings each having a diameter of 15 mm and a thickness of 3 mm. The moldings were heated in a steam stream at 700° C. for 30 min to remove the binder, and sintered in a nitrogen gas flow under sintering conditions specified in the Table 2. The properties of the resultant sintered bodies are also given therein.

As is apparent from the table, according to the present invention, it is possible to produce an AlN sintered body having an excellent shielding property and a high heat conductivity.

The resultant aluminum nitride sintered body was molded into a sheet having a thickness of 0.5±0.01 mm and subjected to measurement of the linear transmittance with FT-IR7000, manufactured by Japan Spectroscopic Co., Ltd., and the heat conductivity with a thermal constant measuring device TC-3000, manufactured by Shinkuu-Rikoh Inc.

A sintered body wherein no titanium stearate had been added was prepared as a comparative sample under the same condition as that described above. The results of the measurement of the linear transmittance are shown in FIG. 1. The heat conductivity of the sintered body according to the example of the present invention was 185 W/m·K, while that of the aluminum nitride sintered body according to the comparative example was 183 W/m·K. As is apparent from the results, the aluminum nitride sintered body of the present invention is excellent in light shielding property and has a high heat conductivity.

TABLE 2

| No. | Sintering aid | Amt. of addition wt. % | Ti compd. | Sintering conditions (°C. × H) | Ti compd. | heat conductivity (W/m · K) | transmittance (%) |
| --- | --- | --- | --- | --- | --- | --- | --- |
| 11 | CaO | 2.0 | TiCO$_3$ | 1800° C. × 3H | TiO | 130 | 1 |
| 12 | CaO | 0.8 | TiCO$_3$ | " | TiO | 130 | 1 |
| 13 | CaO Y$_2$O$_3$ | 0.8 1.5 | TiO$_2$ | " | TiO | 150 | 1 |
| 14 | Gd$_2$O$_3$ | 1.5 | TiO$_2$ | " | TiO | 130 | 1 |
| 15 | Y(NO$_3$)$_3$ | 1.5 | TiO$_2$ | " | TiO | 140 | 1 |

EXAMPLE 3

A Y$_2$O$_3$ powder (particle diameter: 0.5 μm) and titanium stearate in an amount of 0.3% by weight in terms of titanium were added to an aluminum nitride powder having an average particle diameter of 1.5 μm (oxygen content: 1.5% by weight, carbon content: 0.04% by weight, content of metal impurities: 0.1% by weight or less). 11% by weight of an organic binder for molding was added to the mixed powder, and they were mixed with each other in a combined solvent comprising toluene and alcohol. The organic binder used was a mixture of polyvinyl butyral (PVB) with dibutyl phthalate (DBP) in a ratio of 6:4. Thereafter, the mixture was molded by the doctor blade method into a sheet having a thickness of 0.8 mm. The molding was heated in a nitrogen atmosphere at 600° C. for 2 hr to remove the organic binder component. Thereafter, the molding was sintered in a nitrogen gas atmosphere having a CO gas concentration of 200 ppm or less at 1850° C. for 1 hr.

FIG. 2 shows the results of the ESCA analysis of a sintered body wherein titanium stearate has been added. The figure shows the presence of bond energy levels of 456 eV, 459 eV, 462 eV and 465 eV. The bond energies of 459 eV and 465 eV refer to a bond between the titanium atom and the oxygen atom, while those of 456 and 462 eV refer to a bond between the titanium atom and the nitrogen atom.

EXAMPLE 4

A Y$_2$O$_3$ powder (average particle diameter: 0.5 μm), titanium stearate, a TiO$_2$ powder (average particle diameter: 100 Å) and a titanium alkoxide were added to an aluminum nitride powder having an average particle diameter of 1.5 μm (oxygen content: 1.5% by weight, carbon content: 0.04% by weight, content of metal impurities: 0.1% by weight or less). 11% by weight of an organic binder for molding was added to the mixed powder, and they were mixed with each other in a combined solvent comprising toluene and alcohol. The organic binder for molding used was a mixture of polyvinyl butyral (PVB) with dibutyl phthalate (DBP) in a ratio of 6:4. Thereafter, the mixture was molded by the doctor blade method into a sheet having a thickness of 0.8 mm. The molding was heated in a nitrogen atmosphere at 600° C. for 2 hr to remove the organic binder component. Thereafter, the molding thus obtained was sintered in a nitrogen gas flow atmosphere having a CO gas concentration of 200 ppm or less under various conditions specified in Table 3.

The resultant aluminum nitride sintered bodies were molded into sheets each having a thickness of 0.5±0.01 mm and subjected to measurements of the linear transmittance with FT-IR7000, manufactured by Japan Spectroscopic Co., Ltd., and the heat conductivity with a thermal constant measuring device TC-3000, manufactured by Shinkuu-Rikoh Inc.

The results of the measurements are given in the Table 3, from which it can be understood that the sintered bodies of the present invention are excellent in light shielding property and have a high heat conductivity.

diameter of 1.5 um (oxygen content: 1.4% by weight, carbon content: 0.07% by weight, content of impurities: 0.1% by weight or less). 11% by weight of an organic binder for molding was added to the mixed powder, and they were mixed with each other in a combined solvent comprising toluene and alcohol. The organic binder for molding used was a mixture of polyvinyl butyral (PVB) with dibutyl phthalate (DBP) in a ratio of 6:4. Thereafter, the mixture was molded by the doctor blade method into a sheet having a thickness of 0.8 mm. The molding was heated in a nitrogen atmosphere at 600° C. for 2 hr to remove the organic binder component. Thereafter, the molding was sintered in a nitrogen gas flow atmosphere having a CO gas concentration of 200 ppm or less under various conditions specified in Table 4.

The resultant aluminum nitride sintered bodies were molded into sheets each having a thickness of 0.5±0.01 mm and subjected to measurements of the linear transmittance with FT-IR7000, manufactured by Japan Spectroscopic Co., Ltd., and the heat conductivity with a thermal constant measuring device TC-3000, manufactured by Shinkuu-Rikoh Inc.

TABLE 3

| No. | $Y_2O_3$ amt. of addition wt. % | Ti compd. | Amount of addition, wt. % (in terms of Ti) | Sintering conditions (°C. × hr) | Ti compd. (according to ESCA) | Properties of sintered body | |
|---|---|---|---|---|---|---|---|
| | | | | | | heat conductivity (W/m·K) | transmittance (%) |
| 1 | 1.0 | $TiO_2$ | 0.01 | 1850° C. × 2H | Ti-N-O | 180 | 3.0 |
| 2 | 1.0 | " | 0.05 | " | Ti-N-O | 182 | 2.3 |
| 3 | 1.0 | " | 0.10 | " | Ti-N-O | 180 | 1.5 |
| 4 | 1.0 | " | 0.50 | " | Ti-N-O | 178 | 1.0 |
| 5 | 1.0 | " | 1.0 | " | Ti-N-O | 175 | 0.5 |
| 6 | 1.0 | " | 5.0 | " | Ti-N-O | 170 | 0.5 |
| 7 | 0.5 | Ti alkoxide | 0.5 | 1750° C. × 5H | Ti-N-O | 150 | 1.0 |
| 8 | 0.5 | " | 1.0 | " | Ti-N-O | 155 | 0.6 |
| 9 | 1.0 | " | 0.5 | " | Ti-N-O | 158 | 0.9 |
| 10 | 1.0 | " | 1.0 | " | Ti-N-O | 157 | 0.7 |
| 11 | 5.0 | " | 0.5 | " | Ti-N-O | 166 | 1.0 |
| 12 | 5.0 | Ti alkoxide | 1.0 | 1750° C. × 5H | Ti-N-O | 164 | 1.1 |
| 13 | 0.5 | Ti stearate | 0.3 | 1800° C. × 3H | Ti-N-O | 193 | 1.2 |
| 14 | 0.5 | " | 0.6 | " | Ti-N-O | 195 | 0.8 |
| 15 | 1.0 | " | 0.3 | " | Ti-N-O | 225 | 1.4 |
| 16 | 1.0 | Ti stearate | 0.6 | 1800° C. × 3H | Ti-N-O | 201 | 0.7 |
| 17 | 3.0 | " | 0.3 | " | Ti-N-O | 197 | 1.1 |
| 18 | 3.0 | Ti stearate | 0.6 | " | Ti-N-O | 189 | 0.6 |
| 19 | 5.0 | " | 0.3 | " | Ti-N-O | 210 | 1.0 |
| 20 | 5.0 | — | 0.0 | " | — | 194 | 11 |

Note:
No. 20 is a comparative example wherein no Ti compound has been added.

EXAMPLE 5

A CaO powder (average particle diameter: 1.5 μm), titanium stearate a $TiO_2$ powder (average particle diameter: 100 Å) and titanium alkoxide were added to an aluminum nitride powder having an average particle The results of the measurements are given in the Table 4, from which it can be understood that the sintered bodies of the present invention are excellent in light shielding property and have a high heat conductivity.

TABLE 4

| No. | CaO amt. of addition, wt. % | Ti compd. | Amt. of addition, wt. % (in terms of Ti) | Sintering conditions (°C. × H) | Ti compd. (according to ESCA) | Properties of sintered body | |
|---|---|---|---|---|---|---|---|
| | | | | | | heat conductivity (W/m·K) | linear transmittance (%) |
| 21 | 1.0 | $TiO_2$ | 0.01 | 1750° C. × 3H | Ti-N-O | 162 | 3.8 |
| 22 | 1.0 | " | 0.05 | " | Ti-N-O | 163 | 2.3 |
| 23 | 1.0 | " | 0.10 | " | Ti-N-O | 169 | 2.1 |
| 24 | 1.0 | " | 0.50 | " | Ti-N-O | 167 | 1.0 |
| 25 | 1.0 | " | 1.0 | " | Ti-N-O | 166 | 0.8 |
| 26 | 1.0 | " | 5.0 | " | Ti-N-O | 170 | 0.7 |
| 27 | 0.5 | Ti alkoxide | 0.5 | 1450° C. × 5H | Ti-N-O | 150 | 0.9 |
| 28 | 0.5 | " | 1.0 | " | Ti-N-O | 145 | 0.7 |
| 29 | 1.0 | Ti alkoxide | 0.5 | 1450° C. × 5H | Ti-N-O | 153 | 0.8 |
| 30 | 1.0 | " | 1.0 | " | Ti-N-O | 157 | 0.5 |
| 31 | 3.0 | " | 0.5 | " | Ti-N-O | 166 | 0.5 |

TABLE 4-continued

| No. | CaO amt. of addition, wt. % | Ti compd. | Amt. of addition, wt. % (in terms of Ti) | Sintering conditions (°C. × H) | Ti compd. (according to ESCA) | Properties of sintered body | |
|---|---|---|---|---|---|---|---|
| | | | | | | heat conductivity (W/m · K) | linear transmittance (%) |
| 32 | 3.0 | " | 1.0 | " | Ti-N-O | 164 | 0.8 |
| 33 | 0.5 | Ti stearate | 0.3 | 1800° C. × 3H | Ti-N-O | 173 | 1.3 |
| 34 | 0.5 | " | 0.6 | " | Ti-N-O | 175 | 0.9 |
| 35 | 1.0 | " | 0.3 | " | Ti-N-O | 185 | 1.1 |
| 36 | 1.0 | " | 0.6 | " | Ti-N-O | 191 | 1.0 |
| 37 | 3.0 | " | 0.3 | " | Ti-N-O | 187 | 0.9 |
| 38 | 3.0 | " | 0.6 | " | Ti-N-O | 189 | 0.9 |
| 39 | 3.0 | " | 0.3 | 1900° C. × 5H | Ti-N-O | 201 | 1.2 |
| 40 | 3.0 | " | 0.0 | " | — | 194 | 10 |

Note:
No. 40 is a comparative example wherein no Ti compound has been added.

EXAMPLE 6

A $CaCO_3$ powder (average particle diameter: 1.5 μm) and a $Y_2O_3$ powder (average particle diameter 0.5 μm) were added to an aluminum nitride powder having an average particle diameter of 0.87 μm (oxygen content: 0.9% by weight, carbon content: 0.03% by weight, content of impurities: 0.1% by weight or less). In this case, the $CaCO_3$ powder was added so that the mole ratio of the $CaCO_3$ in terms of CaO to the $Y_2O_3$ powder was 1:1. Titanium stearate, a $TiO_2$ powder (average particle diameter: 100 Å) and titanium alkoxide were added to the mixture. 5.0% by weight of an organic binder for molding was added to the mixture, and they were mixed with each other in a combined solvent comprising toluene and alcohol. The organic binder used for molding was a mixture of polyvinyl butyral (PVB) with dibutyl phthalate (DBP) in a ratio of 6:4. Thereafter, the mixture was dry-pressed to prepare a molding having a size of 25×25×1.0 (mm). The molding was heated in a nitrogen atmosphere at 600° C. for 2 hr to remove the organic binder component. Thereafter, the treated molding was sintered in a nitrogen gas flow atmosphere having a CO gas concentration of 200 ppm or less under various conditions specified in Table 5.

The resultant sintered bodies were formed into sheets having a thickness of 0.5±0.01 mm and subjected to measurements of the linear transmittance with FT-IR7000, manufactured by Japan Spectroscopic Co., Ltd., and the heat conductivity with a thermal constant measuring device TC-3000, manufactured by Shinkuu-Rikoh Inc. The results of the measurements are given in Table 5, from which it can be understood that the sintered bodies of the present invention are excellent in light shielding property and have a high heat conductivity.

TABLE 5

| No. | CaO + $Y_2O_3$ amt. of addition, wt. % | Ti compd. | Amt. of addition, wt. % (in terms of Ti) | Sintering conditions (°C. × hr) | Ti compd. (according to ESCA) | Properties of sintered body | |
|---|---|---|---|---|---|---|---|
| | | | | | | heat conductivity (W/m · K) | linear transmittance (%) |
| 41 | 1.0 | $TiO_2$ | 0.01 | 1700° C. × 3H | Ti-N-O | 160 | 4.0 |
| 42 | 1.0 | " | 0.05 | " | Ti-N-O | 159 | 2.3 |
| 43 | 1.0 | " | 0.10 | " | Ti-N-O | 159 | 2.1 |
| 44 | 1.0 | " | 0.50 | " | Ti-N-O | 165 | 1.5 |
| 45 | 1.0 | " | 1.0 | " | Ti-N-O | 163 | 0.8 |
| 46 | 1.0 | " | 5.0 | " | Ti-N-O | 167 | 0.5 |
| 47 | 0.5 | Ti alkoxide | 0.5 | 1650° C. × 5H | Ti-N-O | 150 | 1.3 |
| 48 | 0.5 | " | 1.0 | " | Ti-N-O | 152 | 0.9 |
| 49 | 1.0 | " | 0.5 | " | Ti-N-O | 154 | 1.1 |
| 50 | 1.0 | " | 1.0 | " | Ti-N-O | 157 | 0.8 |
| 51 | 3.0 | " | 0.5 | " | Ti-N-O | 156 | 1.1 |
| 52 | 3.0 | Ti alkoxide | 1.0 | 1650° C. × 5H | Ti-N-O | 154 | 1.0 |
| 53 | 0.5 | Ti stearate | 0.3 | 1800° C. × 3H | Ti-N-O | 185 | 1.3 |
| 54 | 0.5 | " | 0.6 | " | Ti-N-O | 180 | 1.1 |
| 55 | 1.0 | " | 0.3 | " | Ti-N-O | 193 | 1.0 |
| 56 | 1.0 | Ti stearate | 0.6 | 1800° C. × 3H | Ti-N-O | 191 | 0.7 |
| 57 | 3.0 | " | 0.3 | " | Ti-N-O | 199 | 1.1 |
| 58 | 3.0 | " | 0.6 | " | Ti-N-O | 198 | 0.8 |
| 59 | 3.0 | " | 0.3 | 1700° C. × 5H | Ti-N-O | 179 | 1.1 |
| 60 | 3.0 | — | 0.0 | " | — | 174 | 11 |

Note:
No. 60 is a comparative example wherein no Ti compound has been added.

EXAMPLE 7

A titanium compound in an amount of 0.2% by weight in terms of Ti and each sintering aid listed in Table 6 were added to an aluminum nitride powder having an average particle diameter of 0.8 μm (oxygen content: 1.5% by weight, carbon content: 0.03% by weight, content of metal impurities: 0.1% by weight or less). They were sufficiently mixed with each other in alcohol. The resultant mixture was dried and molded on a single spindle press to prepare columnar moldings each having a diameter of 15 mm and a thickness of 1.5 mm. The thus-obtained moldings were heated in a hydrogen gas stream at 700° C. for 30 min to remove the binder, and sintered in a nitrogen gas flow under sintering conditions specified in Table 6. The properties of the resultant sintered bodies were measured in the same manner as that of the Example 6. The results of the measurements are given in the Table 6, from which it can be understood that the sintered bodies of the present invention are excellent in light shielding property and have a high heat conductivity.

TABLE 6

| No. | Sintering aid | Amt. of addition wt. % | Ti compd. | Sintering conditions (°C. × H) | Ti compd. (according to ESCA) | Properties of sintered body | |
|---|---|---|---|---|---|---|---|
| | | | | | | heat conductivity (W/m · K) | transmittance (%) |
| 61 | CaO | 2.0 | TiCO$_3$ | 1800° C. × 3H | Ti-N-O | 150 | 2.3 |
| 62 | CaF$_2$ | 1.5 | TiCO$_3$ | " | Ti-N-O | 169 | 3.5 |
| 63 | Gd$_2$O$_3$ | 1.5 | TiCO$_3$ | " | Ti-N-O | 159 | 2.1 |
| 64 | Y(NO$_3$)$_3$ | 1.5 | TiCO$_3$ | " | Ti-N-O | 155 | 2.2 |
| 65 | CaO Y$_2$O$_3$ | 0.39 1.5 | TiCO$_3$ | " | Ti-N-O | 158 | 2.0 |

INDUSTRIAL APPLICABILITY

As has been described hereinabove, according to the present invention, it is possible to provide an aluminum nitride sintered body excellent in light shielding property and heat conductivity and stabilized in these properties. The aluminum nitride sintered body of the present invention is used as a heat radiating substrate material or a heat radiating component for an IC substrate, IC package, etc., and can be applied to applications where the transmission of light is unfavorable, and components of an automation line wherein use is made of an optical sensor.

We claim:

1. An aluminum nitride sintered body comprising aluminum nitride as a main component, and a titanium compound selected from the group consisting of Ti$_n$O$_{2n-1}$, a solid solution comprising Ti$_n$O$_{2n-1}$ and nitrogen partly dissolved therein, and TiN$_x$O$_y$ wherein $0 < x < 1$, y is $3/2(1-x)$, and n is at least 1, said sintered body having a black color, a linear transmittance of not more than 10% for light having a wavelength of 500 to 650 nm and for light having a wavelength of 6 μm, and a heat conductivity of at least 120 W/m·K, based on a sample thickness of 0.5 mm.

2. An aluminum nitride sintered body comprising aluminum nitride as a main component, and a titanium compound selected from the group consisting of Ti$_n$O$_{2n-1}$, a solid solution comprising Ti$_n$O$_{2n-1}$ and nitrogen partly dissolved therein, and TiN$_x$O$_y$ wherein $0 < x < 1$, y is $3/2(1-x)$, and n is at least 1, said sintered body having a black color, a linear transmittance of not more then 10% for light having a wavelength of 500 to 650 nm and for light having a wavelength of 6 μm, and a heat conductivity of at least 120 W/m·K, based on a sample thickness of 0.5 mm, wherein said aluminum nitride sintered body is produced by adding a sintering aid and 0.05 to 5.0%, by weight, in terms of Ti, of a titanium compound having a maximum primary particle diameter of 500 nm, to an aluminum nitride powder to form a mixture, wherein said aluminum nitride displays an absorption peak in infrared absorption analysis at 750 cm$^{-1}$ or less, molding said mixture to form a shape, heating said shape in a vacuum, air, nitrogen, hydrogen, or an atmosphere comprising a combination of at least two of air, nitrogen, and hydrogen, until a residual carbon content is reduced to 0.2% by weight or less, thereby forming a product, and sintering the product in a non-oxidizing atmosphere containing nitrogen and a maximum CO concentration of 200 ppm at at least 1600° C.

3. The sintered body of claim 2 wherein said sintering aid comprises at least one compound selected from the group consisting of compounds of rare earth elements and alkaline earth elements.

4. An aluminum nitride sintered body comprising aluminum nitride as a main component, and a titanium compound selected from the group consisting of Ti$_n$O$_{2n-1}$, a solid solution comprising Ti$_n$O$_{2n-1}$ and nitrogen partly dissolved therein, and TiN$_x$O$_y$ wherein $0 < x < 1$, y is $3/2(1-x)$, and n is at least 1, said sintered body having a black color, a linear transmittance of not more than 10% for light having a wavelength of 500 to 650 nm and for light having a wavelength of 6 μm, and a heat conductivity of at least 120 W/m·K, based on a sample thickness of 0.5 mm, wherein said aluminum nitride sintered body is produced by adding a sintering aid and 0.05 to 5.0%, by weight, in terms of Ti, of a titanium compound having a primary maximum particle diameter of 500 nm, and a compound capable of forming carbon after being thermally decomposed, to an aluminum nitride powder, wherein said aluminum nitride displays an absorption peak in infrared absorption analysis at 750 cm$^{-1}$, or less, to form a mixture, molding said mixture to form a shape, heating said shape in a vacuum, air, nitrogen, hydrogen, or an atmosphere comprising a combination of at least two of air, nitrogen, and hydrogen, until a residual carbon content is reduced to 0.2% to 2.0% by weight, thereby forming a product, and sintering the product in a non-oxidizing atmosphere containing nitrogen and a maximum CO concentration of 200 ppm at at least 1600° C.

5. The sintered body of claim 4 wherein said sintering aid comprises at least one compound selected from the group consisting of compounds of rare earth elements and alkaline earth elements.

* * * * *

UNITED STATES PATENT AND TRADEMARK OFFICE
CERTIFICATE OF CORRECTION

PATENT NO.   : 5,312,786
DATED        : May 17, 1994
INVENTOR(S)  : YAMAKAWA, et al

It is certified that error appears in the above-identified patent and that said Letters Patent is hereby corrected as shown below:

Cover sheet, item [75], correct to

Inventors:  Akira Yamakawa, Kouiti Sogabe, Kohei Shimoda, and Masaya Miyake, all of Hyogo, Japan Signed and Sealed this Sixteenth Day of August, 1994

Attest:

BRUCE LEHMAN

Attesting Officer     Commissioner of Patents and Trademarks